United States Patent [19]

Johnson

[11] Patent Number: 5,088,521
[45] Date of Patent: Feb. 18, 1992

[54] MUD PUMP VALVE

[75] Inventor: Jerry E. Johnson, Houston, Tex.

[73] Assignee: Harrisburg, Inc., Houston, Tex.

[21] Appl. No.: 604,183

[22] Filed: Oct. 29, 1990

[51] Int. Cl.⁵ ............................................. F16K 15/06
[52] U.S. Cl. .............................. 137/516.29; 137/902; 251/332
[58] Field of Search .................... 137/516.29, 902; 251/332, 358

[56] References Cited

U.S. PATENT DOCUMENTS

| | | | |
|---|---|---|---|
| 2,457,492 | 12/1948 | Raybould | 251/332 |
| 3,053,500 | 9/1962 | Atkinson | 251/332 |
| 3,191,617 | 6/1965 | Maddox | 137/516.29 |
| 4,487,222 | 12/1984 | Crawford | 137/516.29 |
| 4,518,329 | 5/1985 | Weaver | 137/516.29 X |
| 4,860,995 | 8/1989 | Rogers | 137/516.29 X |

Primary Examiner—Robert G. Nilson
Attorney, Agent, or Firm—Marshall, O'Toole Gerstein, Murray & Bicknell

[57] ABSTRACT

A valve for use in a valve housing which forms a flow passage, an annular valve seat being provided in the passage and the seat forming an annular seal surface, the housing, the seat and the passage being concentric on a valve axis. The valve includes a valve body which reciprocates on the axis in the housing toward and away from the seat, guide means on the valve body for slidingly engaging the seat and guiding the reciprocation of the valve body on the axis, and an annular insert mounted on the valve body adjacent the seal surface and concentric with the axis. The insert comprises a rigid part and a resilient elastomeric seal part, the rigid and seal parts being bonded together. The valve body includes a radially extending portion having an outer periphery and a groove formed in the outer periphery, the insert being mounted in the groove with the seal part facing the seal surface. The outer periphery of the radially extending portion includes a flange which overlies the groove and the insert, the flange engaging and supporting the rigid part. An interlock is also provided between the insert and the radially extending portion.

12 Claims, 3 Drawing Sheets

MUD PUMP VALVE

FIELD AND BACKGROUND OF THE INVENTION

This invention relates to valve assemblies, and more particularly to a valve assembly suited for use, for example, as part of a mud pump used in well drilling operations.

In a typical oil well drilling or well service operation, a positive displacement, reciprocating piston pump is employed to move the drilling mud. Check valve assemblies are connected both to the pump intake and to the pump outlet to ensure that the mud flow is in one direction only as the piston reciprocates.

Valve assemblies for this purpose must function under harsh conditions because the mud contains abrasive particles which wear the valve parts and larger pieces which make a good seal (when the valve assembly is closed) difficult to attain. The valve assembly must function while fluids containing solids and compounds such as acids, pea gravel, sand, liquid carbon dioxide, glass beads, aluminum pellets, mothballs, rock and granulated salt, walnut hulls and cement are flowing through it. The valve assembly must open and close on each reciprocation of the pump piston (up to 1,000 strokes per minute) and therefore it is subjected to constant jarring shocks. Further, it must operate under relatively high pressure conditions, such as up to 20,000 psi.

A typical prior art valve assembly of this nature includes a metal housing, a metal seat formed in the housing, a metal valve which reciprocates to open and close the flow passage, and an elastomeric insert mounted on the valve. The insert, of course, engages the seat to close the passage. The metal parts are accurately machined, and considerable time and expense have been required to manufacture them.

Numerous prior art designs are known. In addition to those shown in FIGS. 1 to 6 herein, John T. Rogers U.S. Pat. No. 4,860,995 shows a design which purports to avoid some of the problems with prior art valves. The Rogers valve includes a metal body part and a plastic insert which forms an upper guide. The plastic insert also includes a flange part which performs the function of the insert of the earlier valves. The metal body part forms a lower guide and supports the plastic insert when the valve is closed.

It is a general object of the present invention to provide an improved valve for use in, for example, a mud or well service pump.

SUMMARY OF THE INVENTION

A valve in accordance with this invention is for use in a valve housing which forms a flow passage, an annular valve seat being provided in the passage and the seat forming an annular seal surface, the housing, the seat and the passage being concentric on a valve axis, the valve including a valve body which reciprocates on said axis in the housing toward and away from the seat, guide means on said valve body for slidingly engaging said seat and guiding the reciprocation of the valve body on said axis, and an annular insert mounted on said valve body adjacent said seal surface and concentric with said axis, said insert comprising a rigid part and a resilient elastomeric seal part, said rigid and seal parts being bonded together, said valve body including a radially extending portion having an outer periphery and a groove formed in said outer periphery, said insert being mounted in said groove with said seal part facing said seal surface, and said outer periphery of said radially extending portion including a flange which overlies said groove and said insert, said flange engaging and supporting said rigid part. Interlock means is also provided between said insert and said radially extending portion.

BRIEF DESCRIPTION OF THE DRAWINGS

The invention will be better understood from the following detailed description taken in conjunction with the accompanying figures of the drawings, wherein.

DETAILED DESCRIPTION OF THE DRAWINGS

Figure 1:
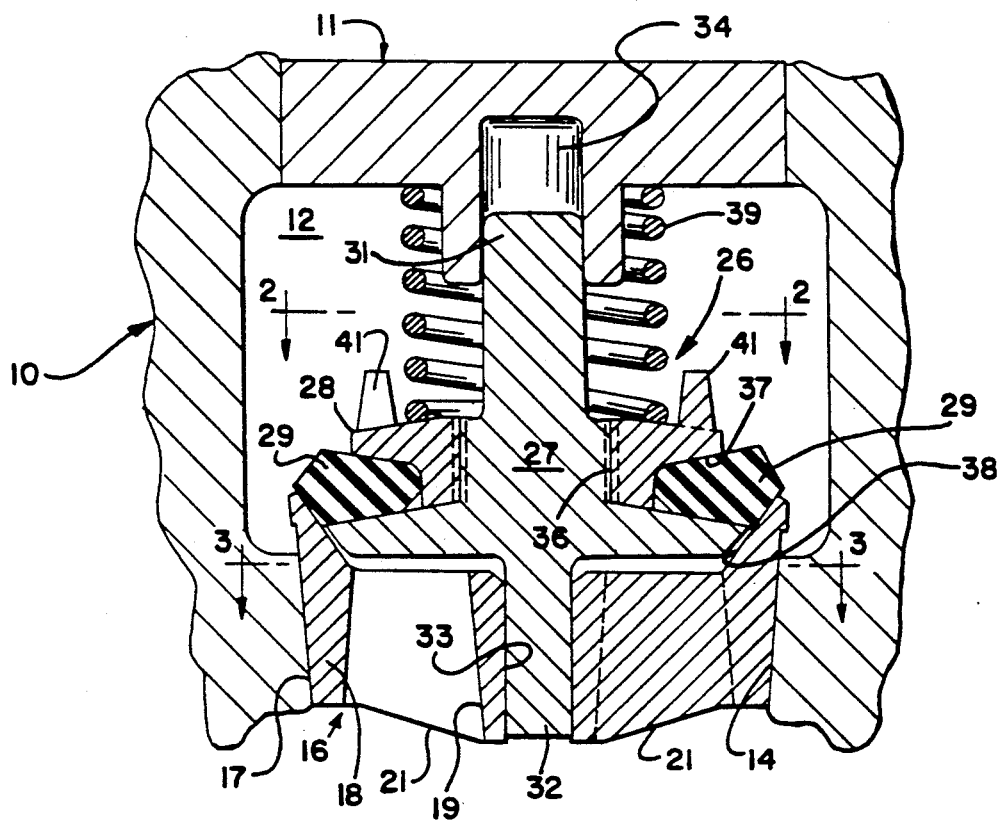
FIG. 1 is a sectional view showing a prior art valve construction.

With reference first to FIG. 1, the prior art valve assembly comprises a valve housing formed by a main housing part 10 and a removable cap 11. A cylindrical cavity 12 is formed within the housing, and the cap 11 closes the upper side of the cavity 12. The cap 11 is removable so that the valve may be repaired. Extending downwardly from the cavity 12 is a circular fluid intake opening formed by a tapered side wall 14. A metal valve seat 16 (also shown in FIG. 3) having a tapered outer surface 17 is tightly mounted within the side wall 14. The valve seat includes a generally cylindrical outer part 18 and a centrally located guide receiver portion 19, the two parts 18 and 19 being connected together by a plurality (in the present instance four) webs 21. During functioning of the valve, fluid flows upwardly (as seen in FIG. 1) through the passages 22 formed between the webs 21 and into the cylindrical cavity 12, and laterally out of the cavity 12 through a radially extending exit flow passage (not illustrated).

Mounted within the valve housing and controlling the flow of the liquid through the passages 22 and into the cavity 12 is a valve 26 formed by a metal main valve body 27, a metal top plate 28 and an insert or elastomeric seal 29. Extending upwardly and downwardly from the main valve body 27 are an upper guide portion 31 and a lower guide portion 32, respectively. The lower guide portion 32 slides within a circular hole 33 formed within the central portion 19 of the valve seat, whereas the upper guide portion 31 slides within a circular hole 34 formed within the cap 11. Threads 36 connect the top plate 28 with the main valve body 27, and the two parts 27 and 28 form a recess 37 between them which receives the elastomeric seal 29. The seal 29 is sized and shaped so that it tightly engages a tapered valve seat surface 38 formed on the valve seat 16. A compression spring 39 extends between the underside of the cap 11 and the top plate 28 and urges the valve to the closed position shown in FIG. 1. The lower end of the compression spring 39 is retained in place by a plurality of posts 41 formed on the upper side of the top plate 28.

Figure 2:
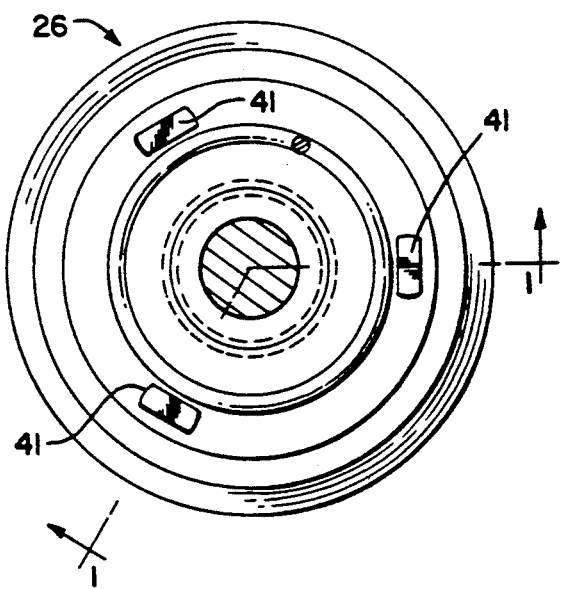
FIG. 2 is a sectional view taken on the line 2—2 of FIG. 1.
Figure 3:
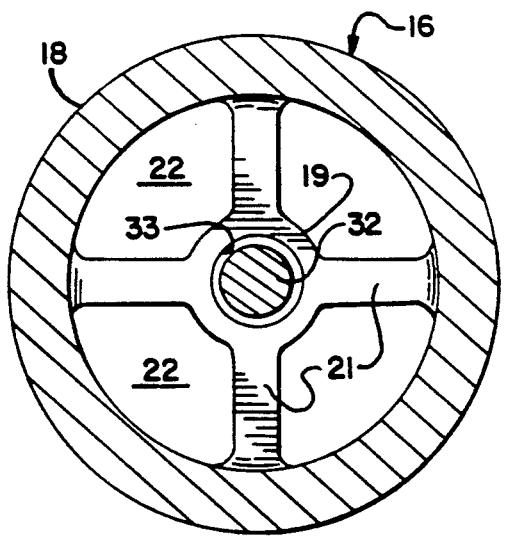
FIG. 3 is a sectional view taken on the line 3—3 of FIG. 1.

During the functioning of the valve shown in FIGS. 1 to 3, pressure of the fluid in the passage 22 on the underside of the valve 26, when it is sufficiently high to overcome the force of the compression spring 39 and the force of the liquid in the cavity 12 acting on the upper side of the valve, will move the valve upwardly such that the seal 29 lifts off of the valve seat surface 38. The liquid then flows upwardly through the passages 22 between the webs 21, through the cavity 12 and out of the outlet. When the differential pressure acting on the valve 26 is such that it is greater on the upper side, the valve moves downwardly to the closed position shown in FIG. 1 and prevents the reverse flow of the liquid from the cavity 12 to the passages 22. The valve guides 31 and 32 slide in the holes 33 and 34 and keep the valve 26 properly centered relative to the valve seat surface.

A problem with the valve shown in FIGS. 1 to 3 is that, during operation, large particles may become lodged between the elastomeric insert 29 and the seat 18. The upper side of the insert 29 is unsupported and may be pushed upwardly by a particle, thereby permitting fluid flow even though the valve is supposed to be closed.

Figure 4:
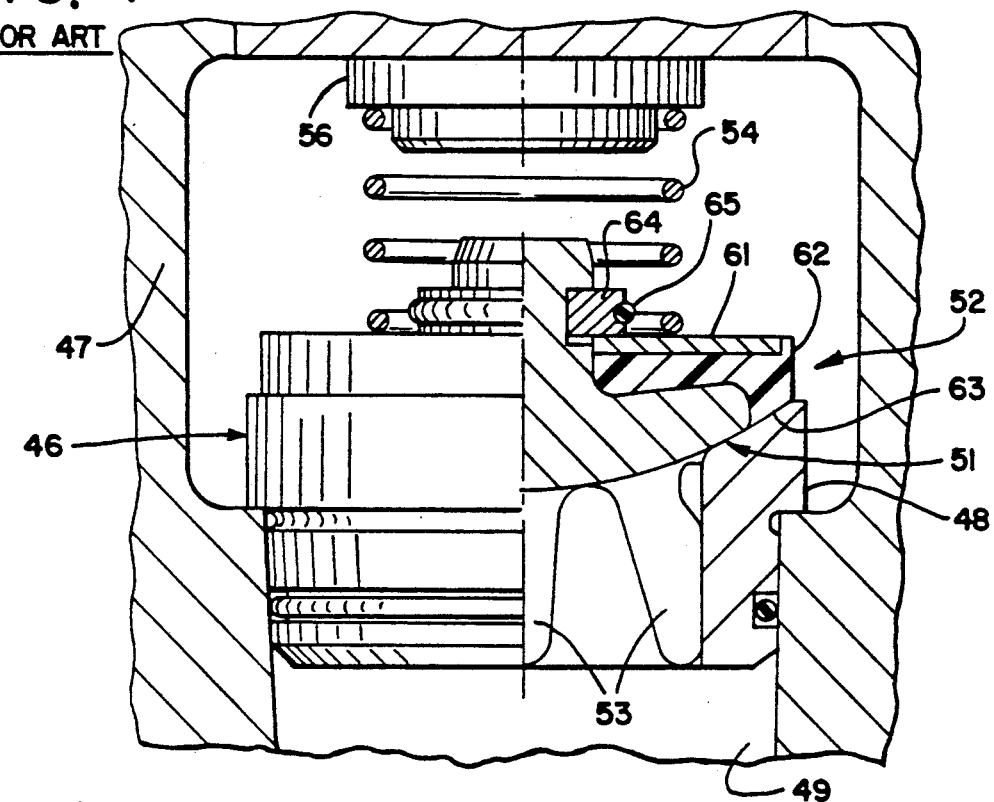
FIG. 4 is a sectional view similar to FIG. 1 and shows another prior art valve.
Figure 5:
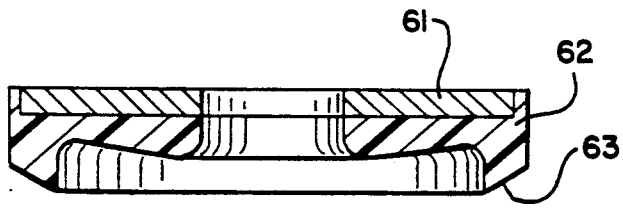
FIG. 5 is a view of an insert of the valve shown in FIG. 4.

FIGS. 4 and 5 show a prior art valve 46 mounted in a housing 47, an annular seat 48 being mounted in a flow passage 49 of the housing. The valve 46 includes a body 51 and an insert 52, the body 51 having downwardly extending legs 53 which engage the interior of the seat 48 and guide the movement of the valve 46. A compression spring 54 between the cap 56 and the valve 46 urges the valve 46 toward the seat 48.

The insert 52 is formed by an annular metal backing plate 61 (see FIG. 5) and a molded elastomer seal 62 which are bonded together. The underside of the seal 62 is shaped to the contour of the upper side of the body 51, and a slanted lower surface 63 engages the upper end of the seat 48. The insert 52 is assembled with the body 51 by positioning the insert on top of the body and securing it to the body with a split cap 64 and a snap ring 65.

While the valve shown in FIGS. 4 and 5 has the advantage that the elastomeric seal 62 can be mounted on the body 51 without stretching it and the seal 62 position is held against movement, this valve has the same disadvantage as the FIG. 1 valve in that the seal 62 is not adequately supported. The seal 62 is bonded to the plate 61 and the plate 61 supports the seal 62, but under harsh conditions, as when pumping large solids, a solid may lodge between the insert and the valve seat. The pressure on the valve may be sufficient to bend the plate 61, thereby causing the valve to fail.

Figure 6:
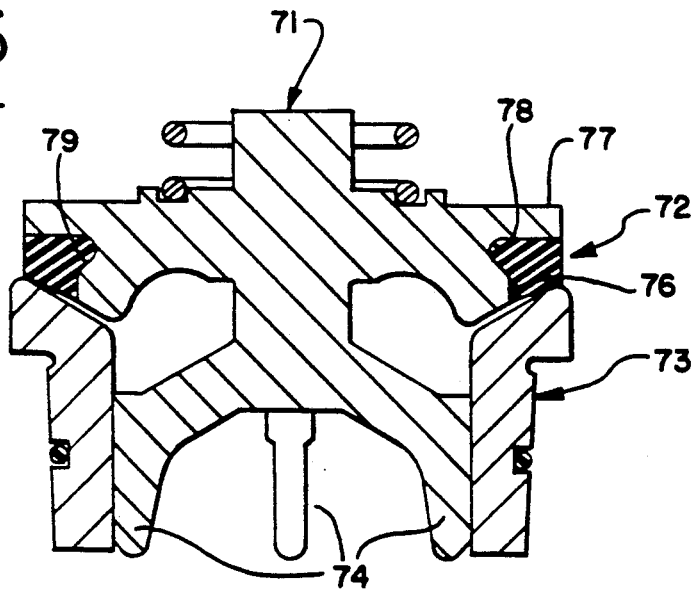
FIG. 6 is a sectional view of another prior art valve.

The valve shown in FIG. 6 purports to overcome the foregoing disadvantages but introduces a different problem. This valve includes a metal valve body 71 having an elastomeric seal 72 attached to it. A seat 73 is mounted on a valve housing (not illustrated) as previously described, and the underside of the seal 72 is engageable with the seat. Legs 74 are formed on the body 71 and slide on the seat 73. In this instance the legs 74 radiate outwardly from the center of the body 71, and therefore they are spaced farther from the flow past the seal 72.

The annular elastomeric seal 72 is mounted in an annular groove 76 formed in the outer periphery of the valve body 71, and a relatively thick flange 77 of the body 71 overlies the seal 72. An annular counter groove or recess 78 is formed on the radially inner side of the groove 76 and the seal 72 includes a bulge 79 molded thereon which extends into the recess 78. This bulge-recess interconnection prevents the seal 72 from moving downwardly and retains the seal in the groove 76 during operation.

The thick flange 77 is sturdy enough that it will not deform, as will the plate 61, when the valve closes on a large solid, and therefore the upper side of the seal 72 is adequately supported. However, to assemble the seal 72 on the body 71, the seal must be stretched and moved over the legs and the lower part of the valve body, and it is snapped into the groove 76 like a rubber band. The seal continues to be stretched after assembly. This stretching of the seal sometimes causes small tears in the elastomeric seal, and these tears can spread or propagate due to the forces encountered during operation and result in failure. Further, since the seal is not rigidly supported and held in place, large solids can deform the seal and produce a gap between the body and the seal. Smaller particles may become impacted in the gap, causing deformation and failure. Still further, even though the seal 72 has a stretch fit in the groove 76, it may move in the groove. Such movement causes wearing of the adjoining surfaces of the valve body and the seat, leading to a sloppy fit and possible failure.

Figure 7:
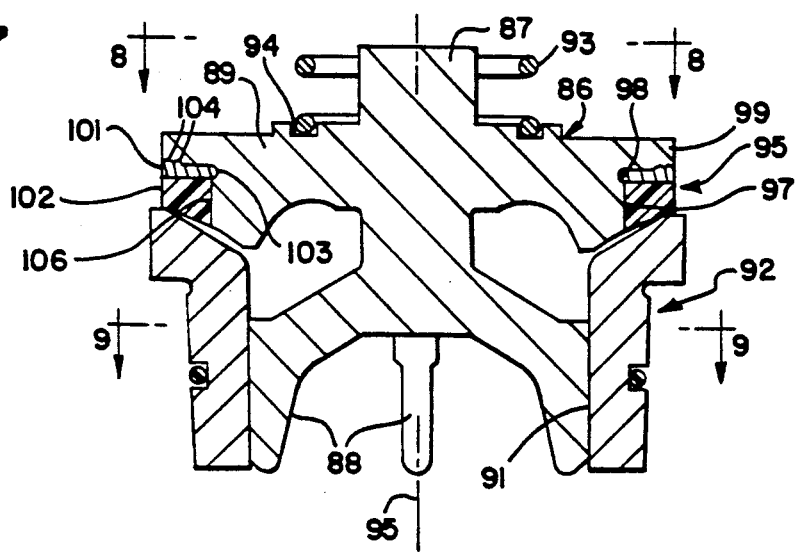
FIG. 7 is a sectional view of a valve in accordance with this invention.
Figure 8:
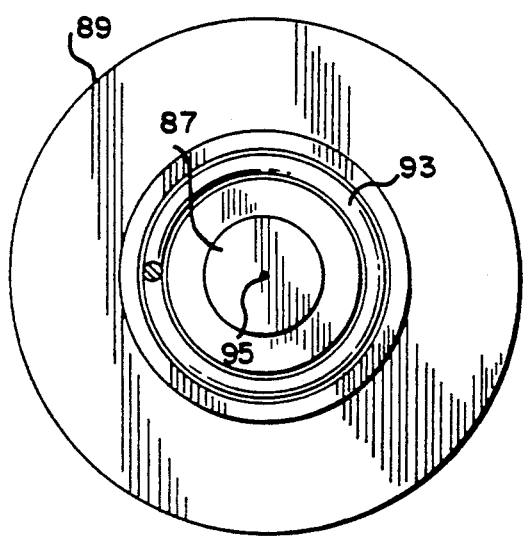
FIG. 8 is a plan view taken on the line 8—8 of FIG. 7.
Figure 9:
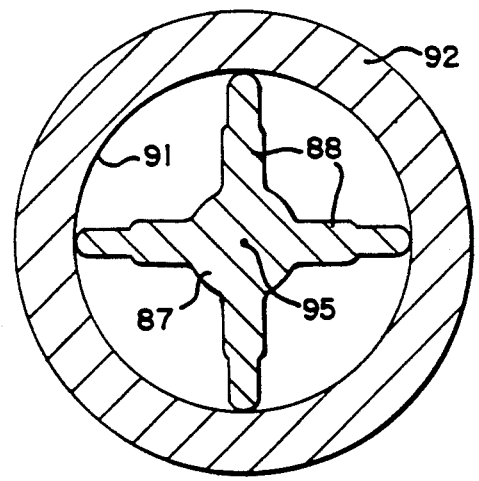
FIG. 9 is a sectional view taken on the line 9—9 of FIG. 7.
Figure 10:
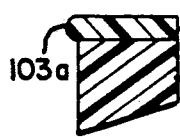
FIGS. 10 through 16 are sectional views illustrating alternative constructions of the insert of the valve shown in FIGS. 7 to 9.
Figure 11:
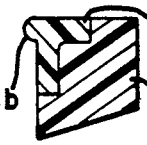
Figure 12:
Figure 13:
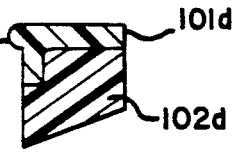
Figure 14:
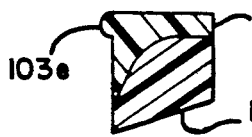
Figure 15:
Figure 16:
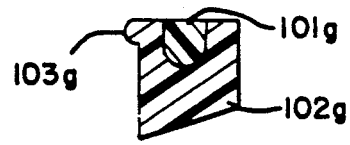

The valve shown in FIGS. 7 to 9, constructed in accordance with this invention, has the purpose of avoiding the aforementioned disadvantages and problems of the prior art valves. The valve is mounted in a valve housing (not shown) similar to the housing 47 shown in FIG. 4. The valve includes a metal valve body 86 formed by a central stem 87, four legs 88 (FIGS. 7 and 9) which extend radially outwardly and downwardly from the lower end of the stem 87, and a radially extending part 89. The outer edges of the legs 88 slidingly engage the inner surface 91 of an annular seat 92 which is similar to the prior art seats shown in FIGS. 4 and 6. A compression spring 93 (similar to the spring 54) extends around the upper end of the stem 87 and urges the valve toward the seat 92. The lower end of the spring 93 fits in an annular groove 94 formed in the upper surface of the radial part 89.

The valve body 87 has a center line or axis 95, which in operation may be vertical or horizontal, and the valve housing and the seat 92 are concentric with the axis. A flow passage through the housing and the seat is provided when the valve is lifted upwardly off the seat 92.

An annular insert 96 is mounted in an annular groove 97 formed in the lower, outer corner of the radial part 89. The groove 97 is substantially square in cross section. A radially extending, shallow annular recess or counter groove 98 is formed in the interior corner of the groove 97 and serves as a retainer for the insert 96. The radial part 86 further includes a relatively thick, stiff radially extending flange 99 which extends across and overlies the upper side of the insert 96.

The insert 96 comprises an annular stiff support plate 101 and a seal 102 which is bonded to the plate 101. The seal 102 is made of a tough resilient material such as rubber, polyurethane or other elastomeric material. The plate 101 is made of a rigid material such as metal or a hard plastic, and it is chemically or mechanically bonded to the seal 102. The plate 101 extends across the upper side of the seal 102 and it engages the underside of the flange 99, and a radially inner bulge 103 of the plate extends into the recess 98 in the groove 97. If desired, one or more small teeth or ridges 104 may be provided on the upper side of the plate 101, which extend into shallow indentations formed in the underside of the flange 99.

To assemble the insert 96 with the body 86, the insert is moved over the bottom of the body 86 and pressed over the vertical wall 106 forming the inner side of the groove 97. As shown in FIG. 7, in its unstressed state the bulge 103 has a slightly smaller diameter than that of the wall 106, and the plate 101 is elastically stretched as it is pressed over the wall 106 and it snaps into the recess 98. The stretching is not beyond the elastic limit of the plate 101, however. The bulge 103 is sized relative to the recess 98 so that there is a tight fit after assembly, thereby preventing the insert from moving after assembly and during operation.

The inner diameter of the seal 102 is substantially equal to the diameter of the wall 106. Consequently little or no stretching of the seal occurs. During assembly when the plate 101 is stretched, the portion of the seal 102 closely adjacent the plate is also stretched slightly but it is supported by the plate 101, and the amount of stretch is not enough to create cracks in the seal during assembly. After assembly there is little or no stretching of the seal.

The heavy flange 99 of the metal body 86 provides firm support for the insert, and the plate 101 retains the insert against movement during operation. The seal 102 is not stretched, thereby avoiding creation and propagation of stress cracks. The rigid plate 101 supports the elastomeric seal and in turn engages and is supported by the flange 99. The plate 101 prevents outward movement of the seal, thereby substantially eliminating the chance that particles may become embedded between the wall 106 and the seal. The interlock or interconnection between the insert and the body, formed by the bulge 103 and the recess 98, plus the teeth 104, if desired, and the mating indentations, prevent the insert from moving in the groove.

The seal part 102 is supported by the rigid plate 101 and the heavy flange 99 which have a combined vertical thickness that is about equal to the vertical thickness of the seal part 102. The plate 101 and the flange 99 are sufficiently heavy that they will not deform if the insert engages a large solid.

FIGS. 10 through 16 show sectional views of alternative constructions of the insert, and each includes a relatively rigid support part 101a to 101g bonded to an elastomeric seal part 102a to 102g. These inserts may be mounted in the groove of the body as described above. In each case the insert includes a bulge 103a to 103g which extends into and interlocks with the recess 98 in the groove. The support parts 101a to 101g support and hold the seal parts 102a to 102g and in turn engage and are supported by the flange 99.

What is claimed is:
1. A valve for use in a valve housing which forms a flow passage, an annular valve seat being mounted on said housing and in said passage, the seat forming an annular seal surface, the housing, the seat and the passage being concentric on a valve axis, said valve comprising:
   a) a valve body which reciprocates during use on said axis in said housing, said body comprising a radially extending portion having an outer periphery adjacent said seal surface, an annular groove formed in said outer periphery, and a flange forming one side of said groove;
   b) an insert mounted in said groove, said insert comprising a rigid support part and an elastomeric seal part, said parts being bonded together, said seal part being engageable with said seal surface, said support part engaging and being supported by said flange, and said support part being out of engagement with said seat when said seal part engages said valve seat, said seal part being between said seat and said support part; and
   c) interlock means connecting said insert with said radially extending portion.

2. A valve as set forth in claim 1, wherein said support part is made of metal.

3. A valve as set forth in claim 1, wherein said support part is made of a rigid plastic.

4. A valve as set forth in claim 1, wherein said flange and said support part are relatively thick and unyielding.

5. A valve for use in a valve housing which forms a flow passage, an annular valve seat being mounted on said housing and in said passage, the seat forming an annular seal surface, the housing, the seat and the passage being concentric on a valve axis, said valve comprising:
   a) a valve body which reciprocates during use on said axis in said housing, said body comprising a radially extending portion having an outer periphery adjacent said seal surface, an annular groove formed in said outer periphery, and a flange forming one side of said groove;
   b) an insert mounted in said groove, said insert comprising a rigid support part and an elastomeric seal part, said parts being bonded together, said seal part being engageable with said seal surface, and said support part engaging and being supported by said flange; and
   c) interlock means connecting said insert with said radially extending portion, said interlock means being formed by a protrusion on said insert and a recess formed in said radially extending portion, said protrusion extending into said recess.

6. A valve as set forth in claim 5, wherein said protrusion is formed on said support part.

7. A valve as set forth in claim 5, wherein said protrusion is formed on said seal part.

8. A valve as set forth in claim 5, wherein said groove is bounded by said flange and a radially inner surface, said recess being formed in said radially inner surface, and said protrusion having an inner diameter which when unstressed is slightly less than the diameter of said radially inner surface.

9. A valve as set forth in claim 8, wherein said inner diameter of said protrusion when unstressed is slightly less than the diameter of said recess.

10. A valve as set forth in claim 5, wherein said support part comprises a flat plate which extends across said flange, said protrusion being formed on the radially inner end of said plate.

11. A valve assembly comprising
a) a valve housing which forms a flow passage;
b) an annular valve seat mounted on said housing and in said passage, said seat forming an annular seal surface, said housing, said seat and said passage being concentric on a valve axis;
c) a valve body which reciprocates during use on said axis in said housing, said body comprising a radially extending portion having an outer periphery adjacent said seal surface, an annular groove formed in said outer periphery, and a flange forming one side of said groove;
d) an insert mounted in said groove, said insert comprising a rigid support part and an elastomeric seal part, said parts being bonded together, said seal part being engageable with said seal surface, said support part engaging and being supported by said flange, and said support part being out of engagement with said seat when said seal part engages said valve seat, said seal part being between said seat and said support part; and
e) interlock means connecting said insert with said radially extending portion.

12. A valve assembly comprising
a) a valve housing which forms a flow passage;
b) an annular valve seat mounted on said housing and in said passage, said seat forming an annular seal surface, said housing, said seat and said passage being concentric on a valve axis;
c) a valve body which reciprocates during use on said axis in said housing, said body comprising a radially extending portion having an outer periphery adjacent said seal surface, an annular groove formed in said outer periphery, and a flange forming one side of said groove;
d) an insert mounted in said groove, said insert comprising a rigid support part and an elastomeric seal part, said parts being bonded together, said seal part being engageable with said seal surface, said support part engaging and being supported by said flange; and
interlock means connecting said insert with said radially extending portion, said support part comprising a flat plate and said interlock including a protrusion formed on the radially inner end of said plate.

* * * * *